United States Patent [19]

Sawluk

[11] 4,041,650

[45] Aug. 16, 1977

[54] MATERIAL REMOVAL TOOL WITH MULTIPLE CUTTING EDGES

[75] Inventor: Wlodzimierz Sawluk, Hamburg, Germany

[73] Assignee: Ernst Winter & Sohn, Hamburg, Germany

[21] Appl. No.: 602,397

[22] Filed: Aug. 6, 1975

Related U.S. Application Data

[62] Division of Ser. No. 385,478, Aug. 3, 1973, Pat. No. 3,898,772.

[30] Foreign Application Priority Data

Aug. 4, 1972 Germany .............................. 2238387

[51] Int. Cl.² ................................................ B24D 7/18
[52] U.S. Cl. ..................................... 51/206 R; 125/15; 51/209 R
[58] Field of Search ............... 51/206 R, 209 R, 206 P, 51/395; 125/15

[56] References Cited

U.S. PATENT DOCUMENTS

| 1,269,653 | 6/1918 | Smith | 51/206 R |
|---|---|---|---|
| 2,808,044 | 10/1957 | Upper | 125/15 |
| 3,064,399 | 11/1962 | Anderson | 125/15 X |
| 3,133,533 | 5/1964 | Sprague | 125/15 X |
| 3,399,254 | 8/1968 | Dunnington | 51/307 X |
| 3,451,721 | 6/1969 | Highberg | 51/206 R |
| 3,498,283 | 3/1970 | Cook | 51/206 R X |
| 3,664,068 | 5/1972 | Metzger | 51/209 R |

Primary Examiner—Gary L. Smith
Attorney, Agent, or Firm—Michael J. Striker

[57] ABSTRACT

A rotatable or reciprocable material removing tool having multiple cutting edges in which a plurality of cutting elements project from an outer surface of a base member of the tool and in which each cutting element comprises a cutting member composed of a homogeneous mass of crystalline diamond particles or crystalline boron nitride particles or a mixture of both, and a connecting member connecting the cutting member to the surface of the base member. Each cutting member forms at least one cutting edge of predetermined outline and the cutting elements are uniformly distributed on the surface of the base member in such a manner that the cutting edges are spaced from each other.

9 Claims, 40 Drawing Figures

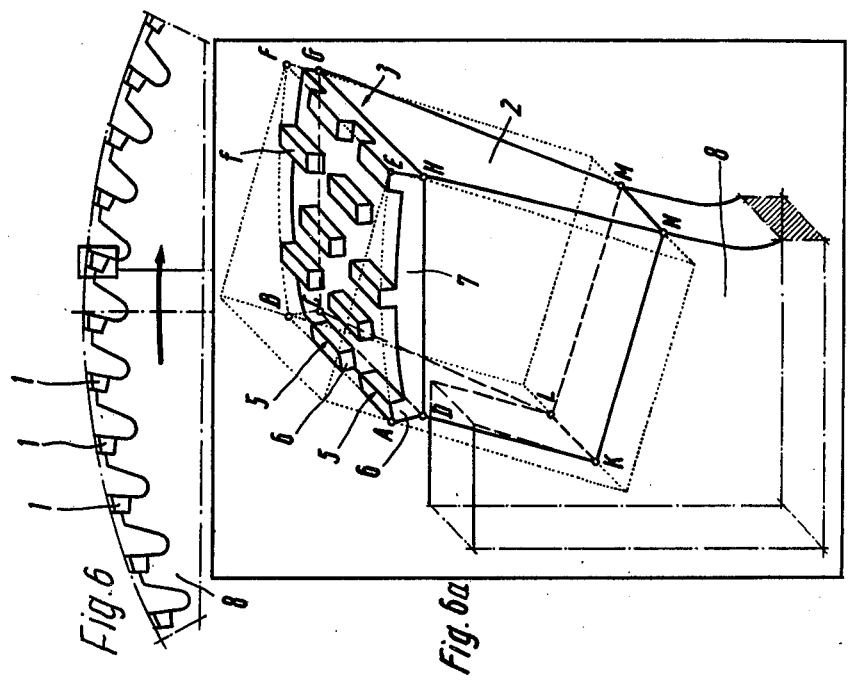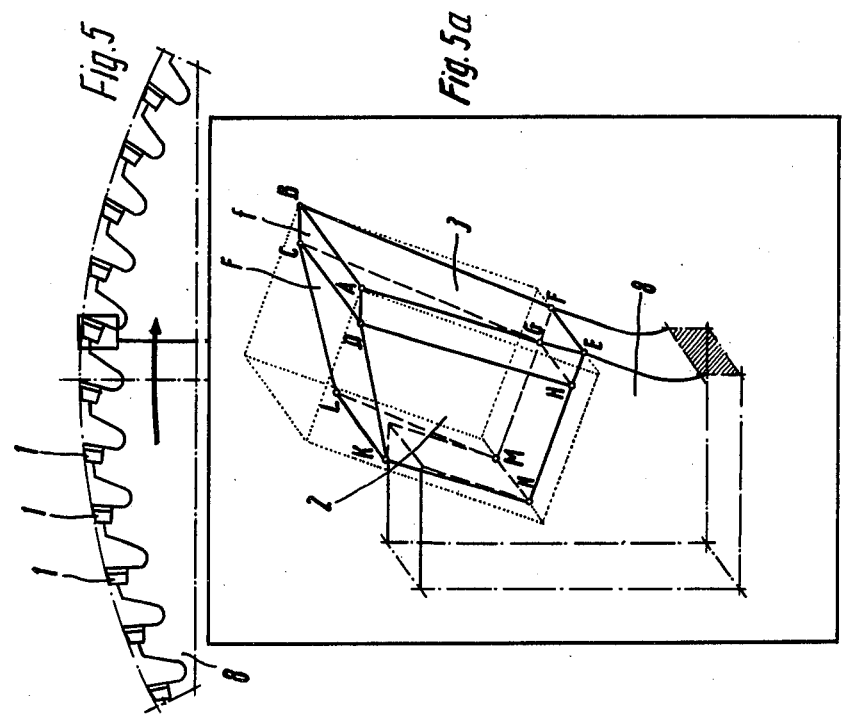

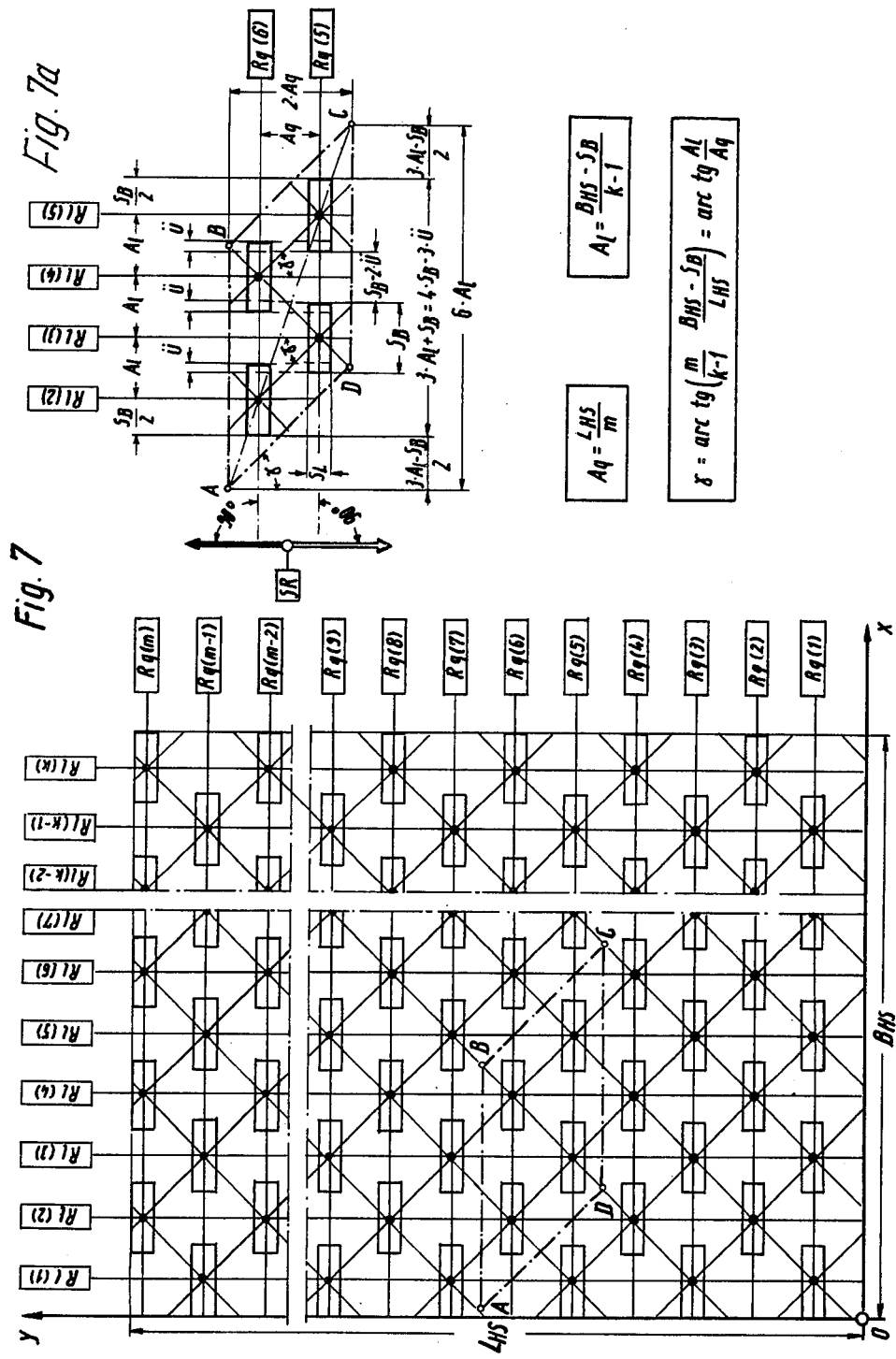

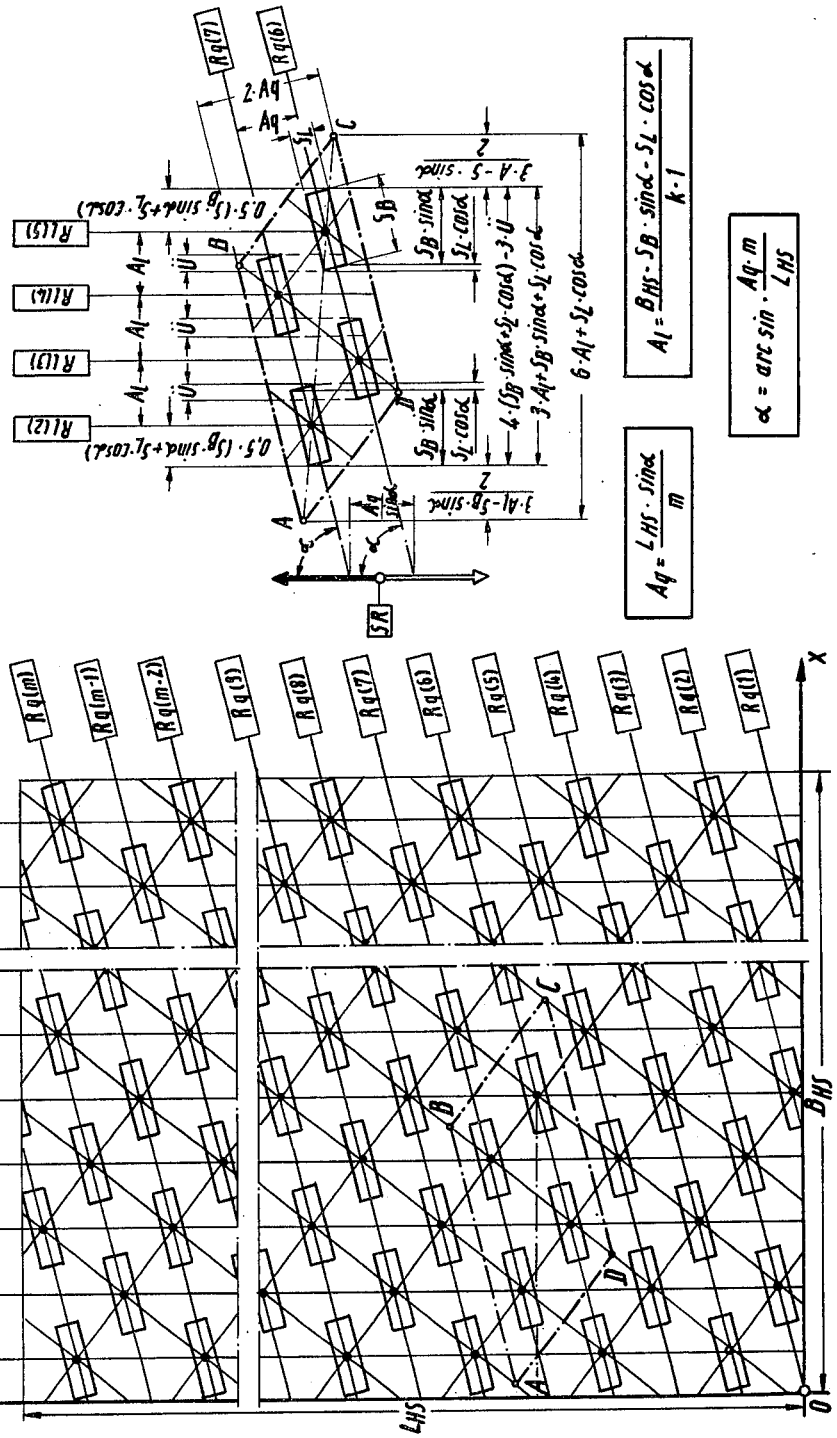

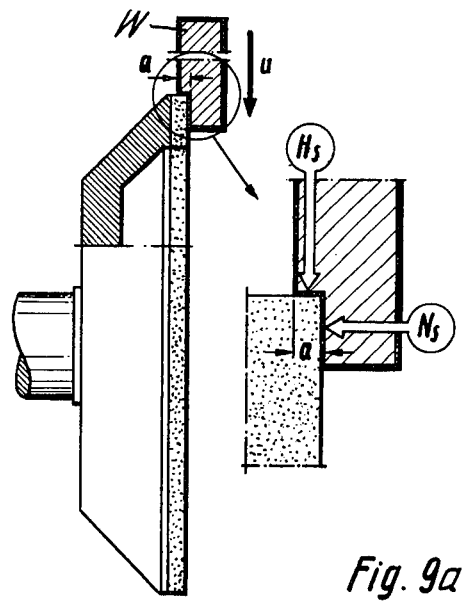
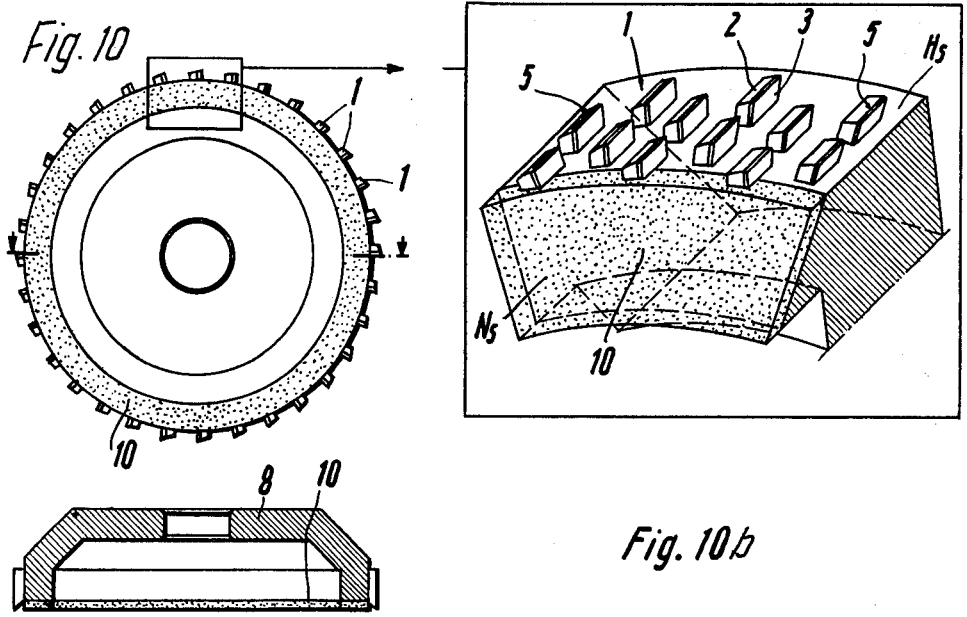

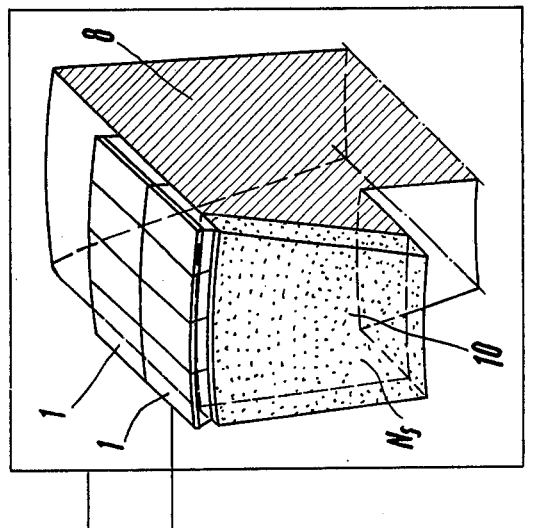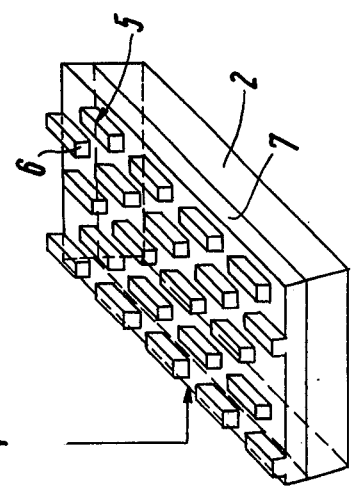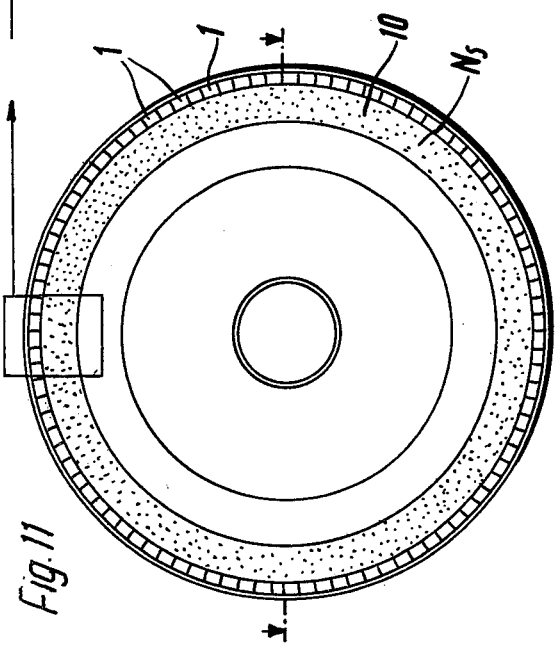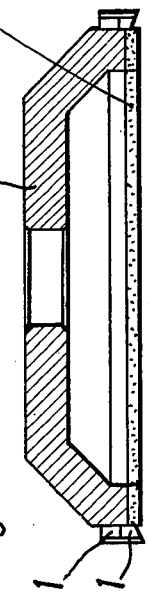

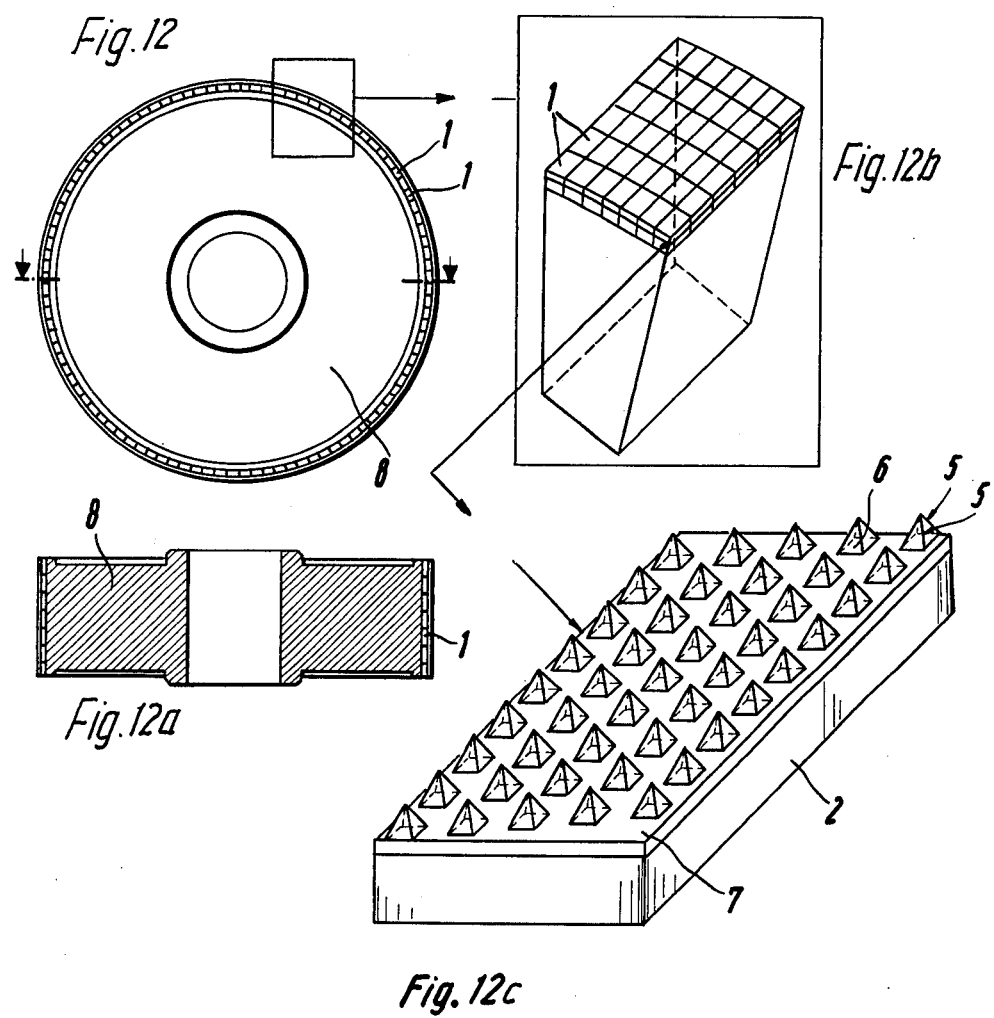

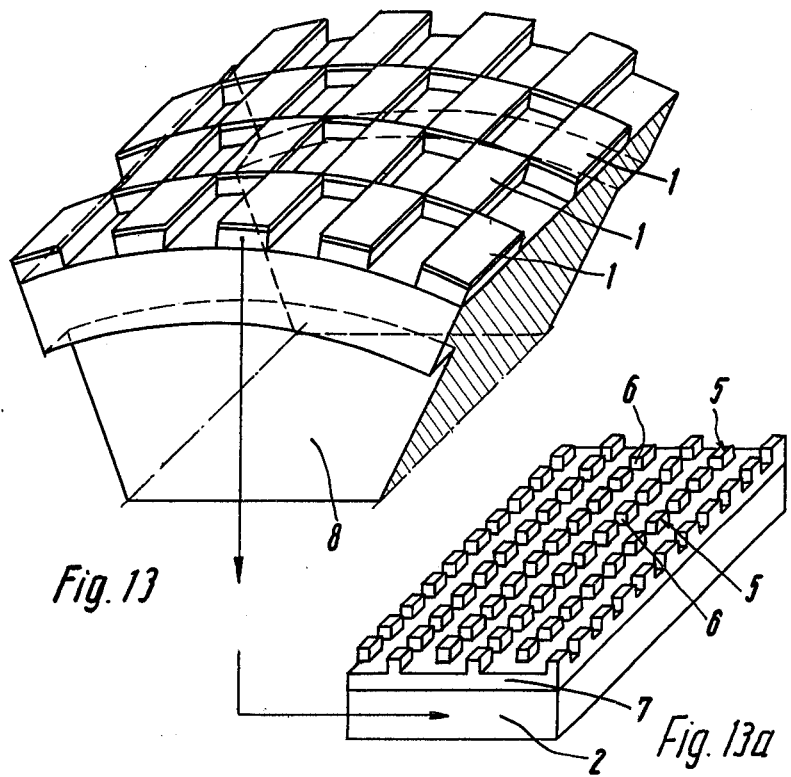
Fig. 13
Fig. 13a
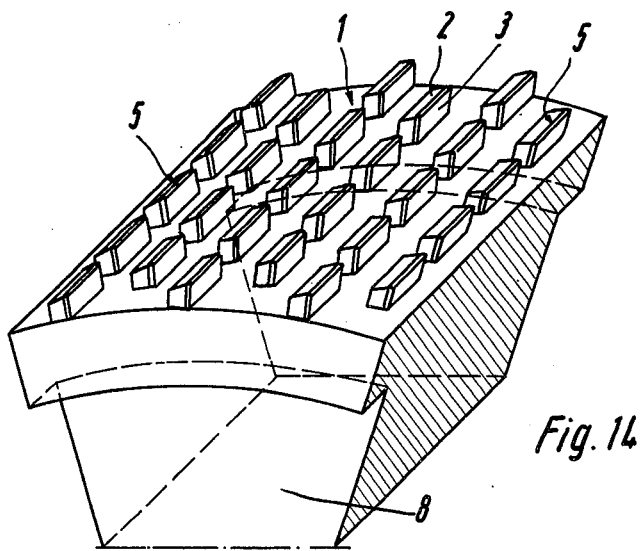
Fig. 14

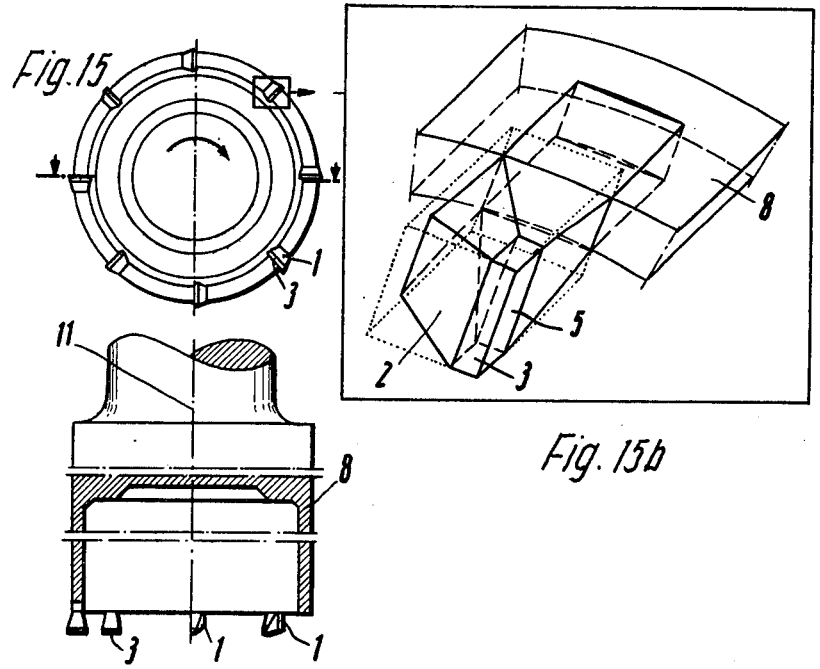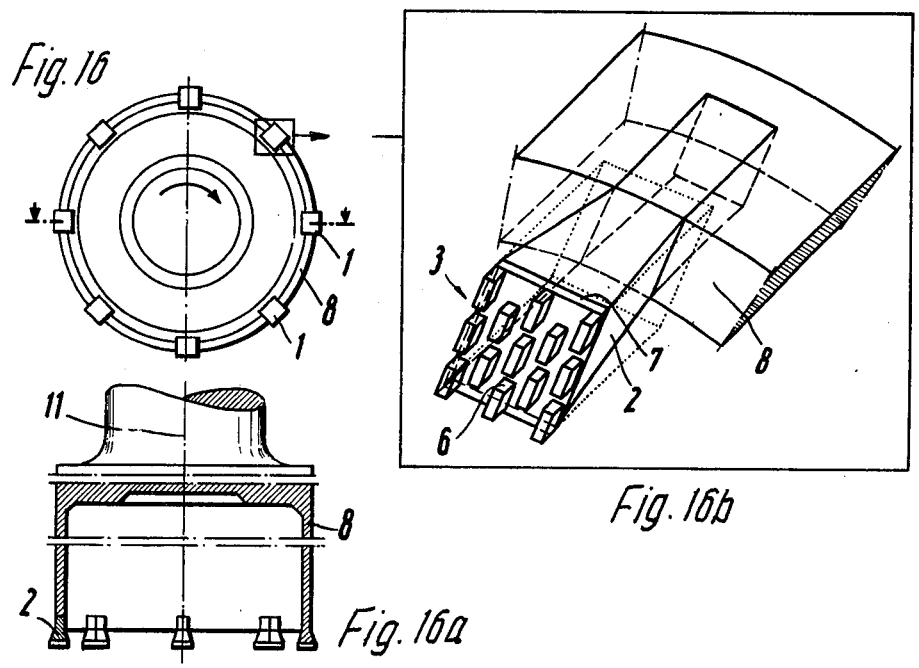

MATERIAL REMOVAL TOOL WITH MULTIPLE CUTTING EDGES

This is a division, of application Ser. No. 385,478 filed Aug. 3, 1973 now U.S. Pat. No. 3,898,772.

BACKGROUND OF THE INVENTION

The present invention relates to rotatable or reciprocable material removal tools with multiple cutting edges, in which on the outer surface of a base member of the tool a plurality of cutting elements are uniformly distributed, as for instance a grinding tool, a wheel dresser, a milling tool, a boring tool, circular saw, or a reciprocating gang saw, or other cutting tools.

Grinding tools such as grinding discs are known in the art in which a layer of grinding material is provided on the peripheral and/or an end face of the grinding disc, and in which the layer of grinding material comprises a binder with a great number of diamond particles or crystalline boron nitride particles partly embedded therein. The grinding particles are necessarily distributed in the binder in an irregular manner. This will not only result in an inferior quality of the ground surface, but grinding tools of the aforementioned kind are also subjected to a relatively great wear. Due to the irregular distribution of the individual grinding particles the danger of individual particles to break away from the binder material is considerable so that subsequent grinding particles are subjected to even greater impacts during the grinding operation and are even more liable to break out of the binder material so that the expensive layer of grinding material will be worn away in a relatively short time.

SUMMARY OF THE INVENTION

It is an object of the present invention to provide a material removal tool with multiple cutting edges which avoids the disadvantages of such tools known in the art.

It is a further object of the present invention to provide a material removal tool with multiple cutting edges in which all cutting edges of the tool are subjected substantially to the same stress and in which these cutting edges are formed on bodies constituted of a homogeneous mass of crystalline diamond particles or crystalline boron nitride particles so that the danger of breaking away of particles, as exists when such particles are partly embedded in a binder, is greatly reduced, and so that further an improved surface quality will be obtained on the workpiece to be machined.

With these and other objects in view, which will become apparent as the description proceeds, the rotatable or reciprocatable material removing tool with a plurality of cutting edges according to the present invention mainly comprises a base member having an outer surface, and a plurality of cutting elements projecting from said outer surface. Each of the cutting elements comprises a cutting member composed of a homogeneous mass of crystalline diamond particles or crystalline boron nitride particles or a mixture of both, and each cutting member has at least one cutting edge of predetermined outline, and a connecting member connecting the cutting member to the aforementioned surface of the base member. The cutting elements are uniformly distributed on the aforementioned surface so that the cutting edges are spaced from each other at least in the cutting direction of the tool.

Since such cutting elements may be manufactured with identical configurations and be uniformly distributed on the aforementioned surface of the cutting tool, it is possible to considerably increase the removal of material from a workpiece and to carry out the machining operation with high cutting speed. Through a suitable selection of the size and the distribution of the cutting edges it is thereby possible that each cutting edge of a cutting element will remove from the workpiece a relatively small, but in size exactly predetermined, chip or shaving. The tool according to the present invention can, therefore, be configured to a form that is suitable to the desired removal of material from the workpiece. Preferably, the cutting elements are to be arranged on the surface of the base member of the tool in such a manner that successively engaging cutting edges of the cutting elements partly overlap each other so that a uniform stressing of the cutting edge, and thereby of the tool, during each rotation of the latter will be assured and so that oscillation of the tool will be prevented or at least considerably reduced.

An additional advantage of the cutting tool according to the present invention relates in the fact that no binder material is used in the cutting member. Such binder material as used in material removing tools according to the prior art does not take part in the removing of material from the workpiece, but such binder material increases the frictional forces created during movement of the tool so that for such tools greater driving forces are necessary than with a tool according to the present invention.

Finally, the useful life of the cutting members of the tool according to the present invention is greatly increased since the crystalline diamond particles or crystalline boron nitride particles cannot break out from a binder material, but these particles form a homogeneous mass which forms a unit with the connecting member which can be connected by soldering, by means of an adhesive or in other known manner, in a perfect manner to the base member of the tool.

It is to be understood that when in the following part of the specification for simplification reasons only diamond material is mentioned, this should not be considered as a restriction of the material from which the cutting members are formed to strictly diamond material, but that such diamond material may be replaced by a homogeneous mass of crystalline boron nitride particles, or a mixture of both materials. Furthermore, when subsequently diamond material is mentioned it is to be understood to be a substantially homogeneous multicrystalline mass of compressed synthetic diamond material produced according to a well known process of a high pressure/high temperature synthesis of such material under use of a catalyst. Such catalyst forms only a small fraction of the material which contains at least 80% of volume of diamond material.

If the connecting member is formed from cemented carbide, than tungsten carbide and cobalt or also titanium carbide may be used therefor. Other metal carbides or metal oxides may be used for the connecting member, eventually alloyed with an additional metal, preferably a metal taken from the iron group, such as cobalt. The individual cutting members are preferably provided, rearwardly of the cutting edge thereof, as considered in the cutting direction of the tool, with a smooth surface having in the cutting direction a dimension which is preferably less than 1.5 mm, since a greater length of the surface would reduce the efficiency of the cutting tool. Such cutting members are especially suitable for the machining of ductile workpieces.

According to a further development of the present invention, the individual cutting elements are provided with a plurality of uniformly distributed cutting edges of predetermined configuration. Preferably, the dimension of each of the cutting edges in the direction transverse to the cutting direction is greater than the dimension of the cutting member normal to the cutting edge. In such cutting elements which are preferably used on brittle workpieces, the free spaces between the individual cutting edges are used for the passage of the shavings removed from the workpiece. Such individual cutting edges may be formed by the edges of projections which project from a plate-shaped portion of the cutting member, and in which the projections and the plate-shaped portion of the cutting elements are formed from a homogeneous mass, such as diamond material, so that the projections will be securely held on the plate-shaped portion of the cutting member. In contradistinction to the known embedding of cutting particles in a binder, a wear of the material between the individual projections will be prevented since the material connecting the individual projections is formed from the same material as the projections themselves.

The projections on the plate-shaped portion of each cutting member are preferably of uniform configuration. Preferably, the projections have the form of square prisms, cylinders, cone frusta or pyramids, since such forms are advantageous during the manufacturing of the projections when the pressure member of the high-pressure form for the production of the cutting elements comprises a matrix which can be easily removed from the compressed diamond material without deforming the projections.

The cutting edges of the cutting elements have to be arranged in accordance with the function the tool has to perform. The same obviously holds true with regard to the arrangement of the cutting member with respect to the connecting member of each cutting element. Thus, the connecting member of each cutting element may be arranged rearwardly, as considered in the cutting direction of the tool, of the cutting member, whereby the latter is provided at its outer surface preferably with a smooth face. On the other hand, the connecting member may also be arranged between the base member of the tool and the cutting member, which is especially advantageous if each cutting element is provided with a plurality of individual cutting edges. If the connecting member is arranged rearwardly of the cutting member, the outer face of the connecting member is preferably downwardly inclined toward the base member in order to provide a relief face necessary for the proper function of the tool. The function is further improved when, in such an arrangement, the front face of the cutting member is inclined at an angle with respect to the cutting direction.

Successive cutting edges of the cutting elements may also be alternatively inclined in different directions with regard to the cutting direction in the manner as known in conventional multi-edge cutting tools.

The tool may also include, in addition to the cutting elements arranged on a main cutting surface of the tool, a grinding layer arranged on a surface normal to the main cutting surface and such a grinding layer may for instance be composed of diamond particles embedded in a layer of binder material, as known in the art so that with such a grinding layer an additional improvement of the surface quality of the finished product may be obtained.

The cutting elements may be arranged uniformly spaced from each other on the surface of the base member of the tool in a plurality of transverse and longitudinally arranged rows. The transverse rows may be arranged normal to the cutting direction or inclined under an acute angle with respect thereto.

Likewise, if each of the cutting members is formed by a plate-shaped portion connected at one surface thereof to the connecting member and provided on a surface opposite the aforementioned surface with a plurality of equal projections, such projections are preferably arranged spaced from each other in transverse and longitudinal rows on the plate-shaped portion, whereby again the transverse rows may be arranged normal to the cutting direction or inclined at an acute angle with respect thereto. Such cutting members comprising a plate-shaped portion and a plurality of equally distributed projections on the outer surface thereof to thus provide a plurality of spaced cutting edges on each cutting member may be formed in a single operation, which is considerably simpler than forming a great number of very small cutting elements and to connect the same then in proper arrangement with the connecting members to the base member of the tool. With such an arrangement especially high cutting efficiencies can be obtained if the connecting members of the cutting members provided with a plurality of cutting edges are arranged on the base member immediately adjacent to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 is a partial side view of a rotary cutting member provided with cutting elements according to the present invention;

FIG. 5a is a perspective view of one of the cutting elements shown in FIG. 5 and drawn to an enlarged scale;

FIG. 6 is a partial side view of a rotary cutting tool similar to that shown in FIG. 5;

FIG. 6a is a perspective view to an enlarged scale of a single cutting element shown in FIG. 6;

FIG. 7 is a developed view of the outer surface of a rotary tool provided with a plurality of cutting elements arranged in transverse and longitudinal rows;

FIG. 7a is a cutout of FIG. 7;

FIG. 8 is a developed view similar to FIG. 7 with the transverse rows arranged at an acute angle with respect to the cutting direction;

FIG. 8a is a cutout of the view shown in FIG. 8;

FIG. 9 is a partially sectioned side view of a pot-shaped grinding wheel;

FIG. 9a shows a portion of FIG. 9 on an enlarged scale;

FIG. 10 is a side view of another pot-shaped grinding wheel;

FIG. 10a is a transverse cross section through the grinding wheel of FIG. 10;

FIG. 10b is a perspective view to an enlarged scale of a portion of the grinding wheel shown in FIG. 10;

FIG. 11 is a side view of another grinding wheel;

FIG. 11a is a transverse cross section through the grinding wheel shown in FIG. 11;

FIG. 11b is a perspective view of a portion of the grinding wheel shown in FIG. 11, drawn to an enlarged scale;

FIG. 11c is a perspective view drawn to a further enlarged scale of a single cutting element provided with a plurality of porjections, as used in the grinding wheel of FIG. 11;

FIG. 12 is a side view of a dressing wheel;

FIG. 12a is a transverse cross section of the dressing wheel shown in FIG. 12;

FIG. 12b is a perspective view of a portion of the dressing wheel shown in FIG. 12, drawn to an enlarged scale, in which the various cutting elements are arranged immediately adjacent to each other;

FIG. 12c is a perspective view drawn to a further enlarged scale of a single cutting element, the cutting member of which is provided with a plurality of pyramid-shaped projections;

FIG. 13 is a partial perspective view of a grinding wheel in which the cutting elements form a grid on the outer surface of the base member;

FIG. 13a is a perspective view, drawn to an enlarged scale, of a single cutting element as used on the grinding wheel shown in FIG. 13 in which each of the cutting elements is provided with a plurality of projections;

FIG. 14 is a partial perspective view of another grinding wheel according to the present invention in which the plurality of cutting elements are differently arranged than in FIG. 13;

FIG. 15 is an end view of a hollow drill with axially projecting cutting elements;

FIG. 15a is a partially sectioned side view of the drill shown in FIG. 15;

FIG. 15b is a perspective view of a single cutting element of the drill as shown in FIG. 15, FIG. 16 is an end view of a hollow drill similar to that shown in FIG. 15;

FIG. 16a is a partially sectioned side view of the drill shown in FIG. 16;

FIG. 16b is a perspective view of a single cutting element as used in the drill of FIG. 16 and drawn to an enlarged scale;

DESCRIPTION OF THE PREFERRED EMBODIMENTS

Figure 1:
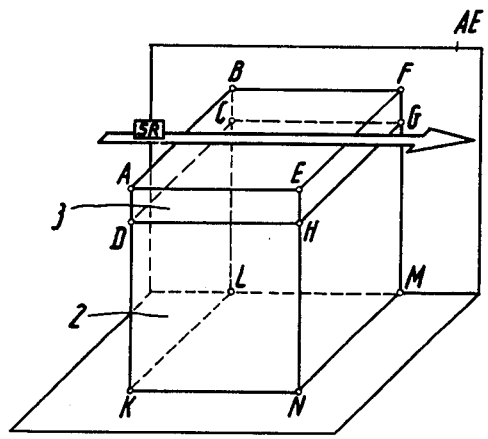
FIG. 1 is a perspective view at an enlarged scale of a cutting element in which the connecting member is arranged between the cutting member and the base member.

FIG. 1a is a perspective view drawn to an enlarged scale of an individual cutting element of a material removing tool according to the present invention. As shown in FIG. 1, the cutting elements may comprise a substantially plate-shaped cutting element 3 formed of a layer of diamond material and a carrier or connecting element 2 in shape of a square prism which connects the cutting element 3 to the outer surface of a base element, not shown in FIG. 1. The connecting element or carrier 2 may be composed of cemented carbide on which the cutting element 3 or diamond layer which is synthetically produced by a known high-pressure/high-temperature synthesis under use of a catalyst in a single operation is pressed 80% of the volume of the layer 3 are of diamond material and the rest is composed of the catalyst. The dimensions of the members 2 and 3 are in FIG. 1 and the following Figures for reasons of better illustration not shown according to scale and actually the layer 3 may be higher than the height of the carrier 2 smaller than shown in the Figures.

The upper surface of the cutting element or diamond layer 3 which is normal to be plane E and parallel to the cutting direction indicated by the arrow I, is smooth.

Figure 2:
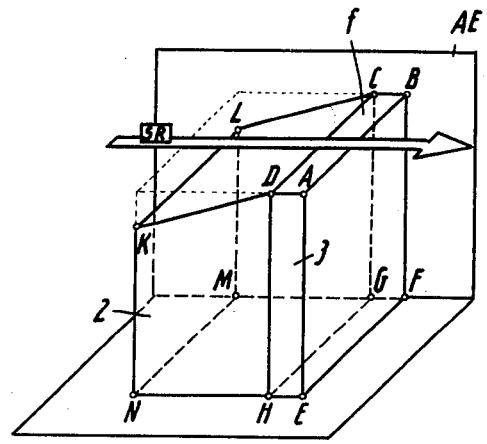
FIG. 2 is a perspective view of a cutting element in which the connecting member is arranged rearwardly, as considered in the cutting direction of the tool of the cutting member.

The cutting element shown in FIG. 2 differs from that illustrated in FIG. 1 in that the carrier or connecting element 2 which is composed of the body CDHGMLKN is arranged rearwardly of the diamond layer 3, as viewed in the cutting direction indicated by the arrow SR. The dimension of the layer 3 in the cutting direction is relatively small. Its upper surface defined by the corners A, B, C, D forms a smooth surface f. The upper surface of the carrier or connecting member 2 defined by the corners D, C, L, K is rearwardly inclined clined towards the outer surface of the base member, not shown in FIG. 2, so as to form a relief surface.

Figure 3:
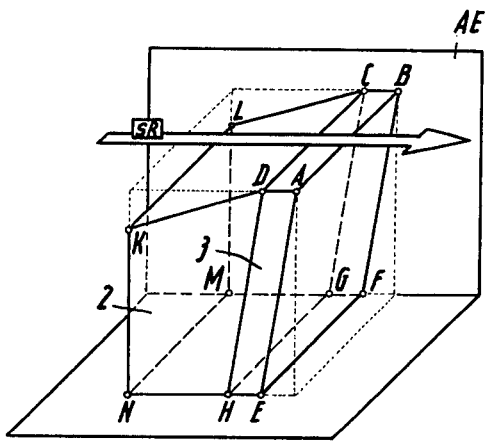
FIG. 3 is a perspective view similar to FIG. 2 in which the cutting member is inclined at an acute angle with respect to the cutting direction.

The cutting element shown in FIG. 3 differs from that illustrated in FIG. 2 only in that the front face of the layer 3 is inclined at an acute angle to the cutting direction.

Figure 4:
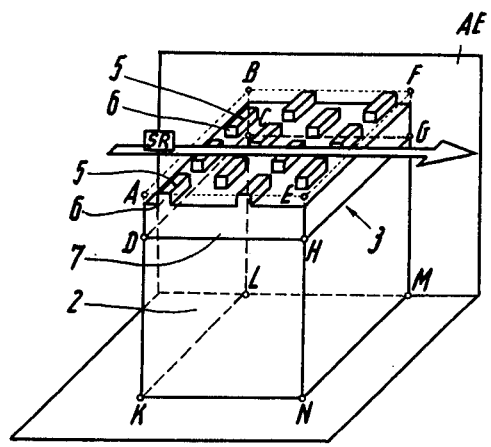
FIG. 4 is a perspective view similar to FIG. 1 in which the cutting member is provided at the outer surface thereof with a plurality of spaced projections.

The cutting element shown in FIG. 4 is similar to that shown in FIG. 1, but differs there from in that the cutting member 3 comprises a plate-shaped portion 7 from the outer surface a plurality of spaced projections in form of square prisms 6 project, each having a cutting edge 5 extending substantially normal the cutting direction indicated by the arrow SR. Each projection 6 may have a dimension in the direction of the arrow SR of, for instance, 1 mm, whereas the dimension normal thereto is a multiple of the aforementioned dimension.

The height of the individual projections 6 in relation to the plate-shaped portion 7 may be greater than shown in FIG. 4. A cutting element 3 as shown in FIG. 4 may be manufactured in a single known process by using a pressure member in which the plate-shaped portion 7 of the cutting member 3 and the projections 6 thereon may be formed in a single pressure operation.

FIG. 5 partially illustrates the base member 8 of a circular saw the teeth of which are respectively provided with cutting elements 1, each of which comprises, as most clearly shown at the large perspective view of FIG. 5a, a carrier or connecting element 2 and a plate-shaped cutting member 3 formed by a layer of synthetic diamond material. Each cutting element is similar to that shown in FIG. 3, that is, the diamond layer 3 is arranged in front of the carrier or connecting element 2, and the front face of the layer 3 is inclined to the cutting direction, in the manner as shown in FIG. 3, whereas the upper face of the connecting element 2 is rearwardly and downwardly inclined to form a relief surface F.

FIG. 6 partially illustrates a circular saw according to the present invention similar to the circular saw shown in FIG. 5, comprising a base member 8 the teeth of which are provided with cutting elements 1, but the cutting elements in this embodiment comprise, as shown in the enlarged view of FIG. 6a, a plate-shaped portion 7 integrally formed with a plurality of spaced projections 6 projecting from the outer surface of the plate-shaped portion 7. The projections 6 are arranged spaced from each other in transverse and longitudinal direction and each having a cutting edge 5 and an upper smooth face $f$. As clearly shown in FIG. 6a, an appropriate clearance is provided between the individual projection 6 through which the material removed from the workpiece may pass.

FIG. 7 illustrates a development of the outer surface of a tool according to the present invention on which a plurality of cutting elements are arranged in spaced longitudinal rows R1 and transverse rows R$q$ normal to the longitudinal rows on the base member of the tool. The proper distribution of the cutting elements on the outer surface of the tool is further illustrated for four cutting elements taken from the portion ABCD of FIG. 7, illustrated in FIG. 7a. As illustrated in FIG. 7a, the transverse rows Rq have a distance from each other $Aq = L_{HS}/M$, whereas the longitudinal rows have a distance from each other $A_1 B_{HS} - S_B/k - 1$ wherein $L_{HS}$ is the total length of the outer surface of the base member, $m$ is the number of the transverse rows, $B_{HS}$ is the width of the base member, $S_B$ is the dimension of the cutting element normal to the cutting direction SR, and $k$ is the number of the longitudinal rows.

While in FIGS. 7 and $a$ the transverse rows extend normal to the cutting direction indicated by the arrow SR, in FIG. 8 and 8a the transverse rows are inclined at an angle $\alpha$ to the cutting direction.

In this arrangement the spacing of the transverse rows from each is $Aq = L_{HS} \sin \alpha/m$, whereas the longitudinal rows are spaced from each other a distance $$Aq = \frac{B_{HS} - S_B \cdot \sin \alpha - S_L \cdot \cos \alpha}{k - 1}$$

wherein $\alpha$ is the angle between the cutting direction SR and the line connecting two elements in one transverse row with each other and $S_L$ is equal to the length of the cutting elements.

It is understood that the above formulas are equally applicable not only for a plurality of cutting elements arranged spaced from each other in a plurality of transverse and longitudinal rows, but corresponding formulas are also applicable for an arrangement of the projections on a single cutting element in which the projections on the plate-shaped portion of the cutting element are likewise arranged in a plurality of transverse and longitudinal rows.

FIG. 9 illustrates a pot-shaped grinding disc having a cylindrical main grinding surface $H_s$ and normal thereto an annular auxiliary grinding surface Ns. In such a tool it is advantageous if the main grinding surface is provided with cutting elements according to the present invention, whereas the auxiliary grinding surface may be provided with a grinding layer as known in the art.

Such tools are illustrated in the following Figures. Thus, FIG. 10 and 10a illustrate, in end view and cross section, a pot-shaped grinding tool provided on its cylindrical surface with a plurality of cutting elements 1 projecting therefrom in radial direction beyond the cylindrical surface of the base member 8. As shown at an enlarged scale in FIG. 10b, the individual cutting elements on the surface $H_s$ are arranged spaced from each other in axial direction and circumferential direction of the tool. Each cutting element 1 is again composed, as shown in FIG. 10b, of a cutting member or layer of diamond material 3 connected to the outer surface $H_s$ of the base member 8 by a connecting member located rearwardly of the respective cutting member 3. Each cutting element has a cutting edge 5 which in this case is arranged normal to the direction of rotation of the cutting member. The auxiliary annular surface $N_s$ of the tool is provided with a conventional grinding layer 10.

The grinding wheel shown in FIGS. 11–11c is similar to that shown in FIG. 10–10b, but differs therefrom in that the individual cutting elements 1 are in this case, as shown in FIG. 11b, arranged closely adjacent each other, and each of the cutting elements 1 is composed, as shown in FIG. 11c, of a substantially plate-shaped layer 7 having on its outer surface a plurality of projections 6 in form of square prisms arranged equally spaced from each other and integrally formed with the plate-shaped portion 7, and each having an individual cutting edge 5. The projections 6 are arranged in a plurality of transverse and longitudinal rows. The auxiliary annular surface $N_s$ is again provided with a conventional grinding layer 10.

The dressing roller shown in FIGS. 12–12c is provided on its peripheral surface with closely arranged cutting elements, each of which comprises, as best shown in an enlarged scale in FIG. 12c, a cutting member composed of a substantilly plate-shaped portion 7 having a plurality of pyramid-shaped projections 6 arranged spaced from each other and integral with the plate-shaped portion 7 in a plurality of transverse and longitudinal rows. Each of the projections 6 has a pair of cutting edges 5. The cutting member 1 is again connected by a connecting member or carrier 2 to the outer surface of the base member 8 and the connecting member may be connected to this outer surface by cementing or soldering.

FIG. 13 illustrates a portion of a grinding wheel in which a plurality of cutting elements 1 are arranged in form of a lattice or grid on the peripheral surface of the base member 8 in a plurality of longitudinal and transverse rows so that the corners of adjacent cutting elements are in contact with each other, as clearly shown in FIG. 13, and each of the cutting elements 1 is composed, as shown in an enlarged scale in FIG. 13a, of a cutting member comprising a plate-shaped portion 7 with a plurality of prism-shaped projections 6, and arranged spaced from each other in a plurality of longitudinal and transverse rows. Each of the cutting members composed of the plate-shaped portion 7 and the projections 6 thereon is again connected to the peripheral surface of the base member 8 by connecting member 2 which may be connected to the peripheral surface by soldering or cementing.

A similar grinding wheel is shown in FIG. 14 in which a plurality of cutting elements, as shown in FIG. 2, are arranged in a plurality of transverse and longitudinal rows on the peripheral surface of the base member 8. Each of the cutting elements 1 comprises a cutting member or layer of diamond material 3 and a connecting member 2 rearwardly arranged therefrom, as considered in the direction of rotation of the wheel and connecting the respective layer 3 to the peripheral surface of the base member. Each of the cutting members 3 has a cutting edge 5 extending normal to the direction of rotation of the wheel.

FIGS. 15 and 15a illustrate in an end view and in partial longitudinal cross section a hollow boring tool having a base member 8 rotatable about an axis 11 and provided on its annular end face with a plurality of cutting elements 1 projecting therefrom. Each of the cutting elements 1 comprises a plate-shaped cutting member 3 of diamond material having a cutting edge 5 extending normal to the direction of rotation of the boring tool and connected to the base member 8 by a connecting member 2 arranged rearwardly of the cutting member 3, as considered in the direction of rotation of the tool, as clearly shown in FIG. 15b.

A similar boring tool is shown in FIGS. 16 16a and 16b and the boring tool shown therein differs from the above-described boring tool in that the cutting member 3 of each cutting element 1 comprises a substantially plate-shaped portion 7 from which a plurality of projections 6 project in axial direction of the tool, and each of the cutting members is again supported and connected to the base member 8 by a connecting member 2. As clearly shown in FIG. 16b, the projections 6 are arranged on the plate-shaped portion in a plurality of transverse and longitudinal rows spaced from each other.

Figure 17:
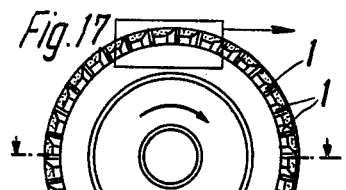
FIG. 17 is an end view of a cylindrical grinding tool according to the present invention with axially projecting cutting elements and a conventional grinding layer on the cylindrical surface of the tool.
Figure 17B:
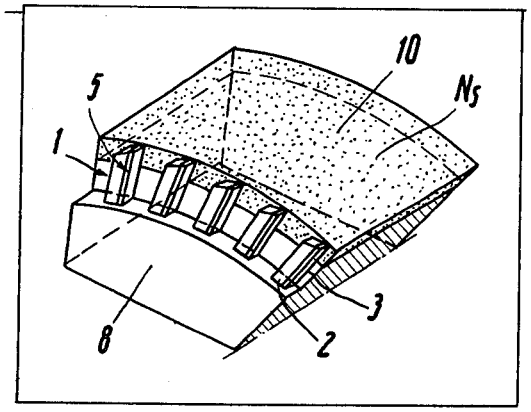
FIG. 17b is a perspective view of a portion of the grinding tool shown in FIG. 17, and drawn to an enlarged scale.
Figure 17A:
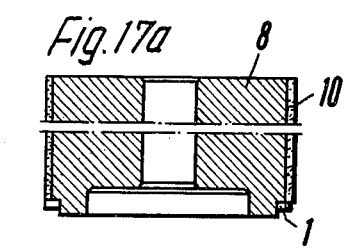
FIG. 17a is a transverse cross section through the tool shown in FIG. 17.

FIGS. 17, 17a and 17b illustrate a cylindrical grinding tool in which a plurality of cutting elements 1 are arranged spaced from each other and projecting in axial direction from the end face of the base member 8. Each of the cutting elements comprises a cutting member or layer of diamond material 3 connected to the base member 8 by a connecting portion 8 arranged rearwardly, as considered in the direction of rotation of the tool, of the layer 3. In addition, the grinding wheel shown in the last-mentioned three figures is provided on its peripheral surface $N_s$ with a conventional layer of grinding material 10.

Figure 18:
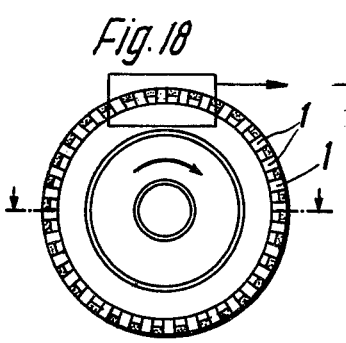
FIG. 18 is an end view of a cylindrical grinding tool similar to that shown in FIG. 17.
Figure 18B:
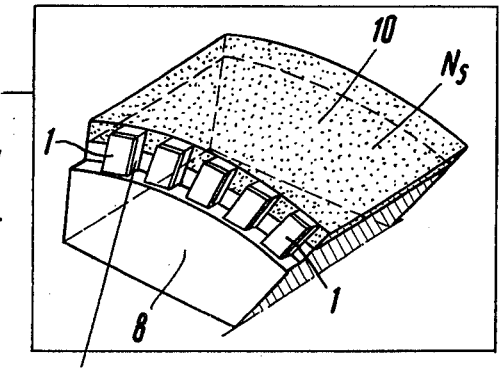
FIG. 18b is a perspective view of a portion of the tool shown in FIG. 18, drawn to an enlarged scale.
Figure 18A:
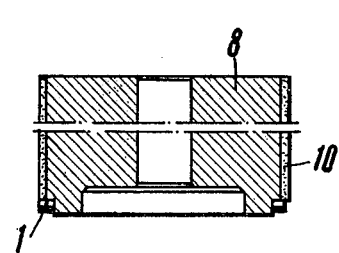
FIG. 18a is an axial cross section of the tool shown in FIG. 18.
Figure 18C:
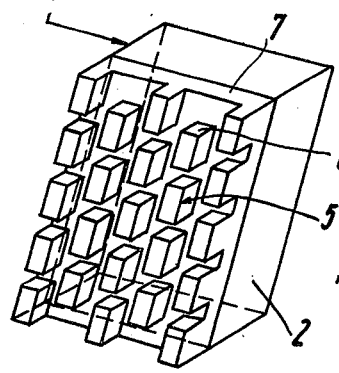
FIG. 18c is a perspective view, drawn to a further enlarged scale; of an individual cutting element provided with a plurality of projections as used in the tool of FIG. 18.

A similar grinding tool is shown in FIGS. 18, 18a, 18b and 18c. Here too a plurality of cutting elements 1 are arranged circumferentially spaced from each other and projecting in axial direction from the annular end face of the base member 8. In this construction, however, each of the cutting elements 1 comprises, as best shown in FIG. 18c, a plate-shaped portion 7 and a plurality of projections which are substantially prism-shaped and arranged spaced from each other in a plurality of transverse and longitudinal rows projecting in axial direction from the outer surface of the plate-shaped portion 7 and each having a cutting edge 5 extending normal to the direction of rotation of the tool. Each of the cutting members comprising the plate-shaped portion 7 and the projections thereon are integrally formed from synthetic diamond material and connected to the end face of the base member 8 by a substantially prism-shaped connecting member 2.

It will be understood that each of the elements described above, or two or more together, may also find a useful application in other types of material removing tools with a plurality of cutting edges differing from the type described above.

While the invention has been illustrated and described as embodied in a material removing tool with a plurality of cutting elements, each comprising a cutting member composed of a homogeneous mass of crystalline diamond particles or crystalline boron nitride particles and having a cutting edge of predetermined outline, and a connecting member connecting the cutting member to the surface of the base member, is is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to the protected by Letters Patent is set forth in the appended claims.

1. In a rotary material removing tool, a combination comprising a base member having a peripheral cylindrical face and end face normal to said cylindrical face; a plurality of cutting elements projecting from one of said faces spaced in the direction of rotation of the tool from each other, each of said cutting elements comprising a cutting member composed of a homogeneous mass including crystalline particles of at least one material chosen from the group consisting of crystalline diamond particles and crystalline boron nitrate particles and constituting at least 80% of the volume of said mass, each of said cutting members having a single cutting edge of predetermined outline, and a connecting member integral with said cutting member and connecting the latter to said one face of said base member so that said cutting elements are uniformly distributed in said direction with said cutting edges spaced from and parallel to each other; and a continuous layer of grinding material covering the other of said faces.

2. A combination as defined in claim 1, wherein said cutting elements project in axial direction of said tool from said end face.

3. A combination as defined in claim 1, wherein said connecting member is formed from cemented carbide.

4. A combination as defined in claim 1, wherein said cutting elements being arranged circumferentially spaced from each other on said peripheral face.

5. A combination as defined in claim 1, wherein said cutting elements are arranged circumferentially and axially spaced on said cylindrical surface.

6. A combination as defined in claim 1, wherein each of said cutting members has rearwardly of said cutting edge, as considered in the cutting direction of the tool, a relief surface.

7. A combination as defined in claim 1, wherein each of said cutting members is plate-shaped and has a thickness, as considered in the cutting direction of the tool, which is smaller that the length of the cutting edge of each cutting member.

8. A combination as defined in claim 4, wherein said connecting member of each cutting element is located rearwardly of the cutting member thereof, as considered in the cutting direction of said tool.

9. A combination as defined in claim 8, wherein each connecting member has rearwardly of the cutting edge of the respective cutting member, as considered in the cutting direction of the tool, a face inclined towards said base member.

* * * * *